(12) United States Patent
Kunow et al.

(10) Patent No.: US 8,106,538 B2
(45) Date of Patent: Jan. 31, 2012

(54) DC VOLTAGE CONVERTING DEVICE

(75) Inventors: Peter Kunow, Berlin (DE); Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 12/796,944

(22) Filed: Jun. 9, 2010

(65) Prior Publication Data

US 2010/0244561 A1   Sep. 30, 2010

Related U.S. Application Data

(62) Division of application No. 10/489,533, filed on Aug. 5, 2004, now Pat. No. 7,759,827.

(30) Foreign Application Priority Data

Sep. 19, 2001 (DE) ............................. 201 15 475 U
Sep. 18, 2002 (EP) ......................... PCT/EP02/10467

(51) Int. Cl.
    *H02J 1/00* (2006.01)
(52) U.S. Cl. ........................................... 307/82; 307/75
(58) Field of Classification Search .............. 307/75
See application file for complete search history.

(56) References Cited

U.S. PATENT DOCUMENTS

| | | |
|---|---|---|
| 1,979,425 A | 11/1934 | Van Der Woude |
| 2,387,800 A | 10/1945 | Leland et al. |
| 3,275,737 A | 9/1966 | Caller |
| 3,324,741 A | 6/1967 | Anderson |
| 3,353,594 A | 11/1967 | Lewis |
| 3,818,307 A | 6/1974 | Hamilton |
| 3,865,142 A | 2/1975 | Begun et al. |
| 3,887,898 A | 6/1975 | Jones |
| 3,980,808 A | 9/1976 | Kikuchi et al. |
| 4,062,057 A | 12/1977 | Perkins et al. |
| 4,124,884 A | 11/1978 | Episcopo |
| 4,290,101 A | 9/1981 | Hergenhan |

(Continued)

FOREIGN PATENT DOCUMENTS

DE   1 199 088   8/1965

(Continued)

OTHER PUBLICATIONS

Chr. Rohrbach: *Handbuch für elektrisches Messen mechanischer Grössen*; 1967, VdI—Verlag, Dusseldorf (DE) XP002156890 (pp. 448-449).

(Continued)

*Primary Examiner* — Rexford Barnie
*Assistant Examiner* — Hal Kaplan
(74) *Attorney, Agent, or Firm* — Conley Rose, P.C.

(57) ABSTRACT

A DC voltage converting device is on the output side connected to a DC voltage source and, on the output side, supplies a converted DC voltage to at least one electrical consumer via a cable connection. To improve such a DC voltage converting device in that also with high DC voltages on the input side, a conversion into another DC voltage is possible without any special constructional efforts and high costs while complicated cooling means or the like, are avoided at the same time, the DC voltage converting device comprises a plurality of DC voltage converting units of which each is serially connected to the DC voltage source on the input side and connected in parallel with the cable connection on the output side for supplying the converted DC voltage.

22 Claims, 2 Drawing Sheets

U.S. PATENT DOCUMENTS

| | | | |
|---|---|---|---|
| 4,309,734 A | 1/1982 | Warren |
| 4,363,975 A | 12/1982 | Beattie |
| 4,378,848 A | 4/1983 | Milberger |
| 4,423,747 A | 1/1984 | Heiser et al. |
| 4,500,832 A | 2/1985 | Mickiewicz |
| 4,521,642 A | 6/1985 | Vives |
| 4,533,987 A | 8/1985 | Tomofuji et al. |
| 4,548,383 A | 10/1985 | Wölfges |
| 4,617,501 A | 10/1986 | Smith |
| 4,639,714 A | 1/1987 | Crowe |
| 4,745,815 A | 5/1988 | Klopfenstein |
| 4,771,982 A | 9/1988 | Bodine et al. |
| 4,788,448 A | 11/1988 | Crowe |
| 4,814,963 A | 3/1989 | Petersen |
| 4,814,965 A | 3/1989 | Peterson |
| 4,920,811 A | 5/1990 | Hopper |
| 5,031,088 A | 7/1991 | Tanaka |
| 5,055,991 A | 10/1991 | Carroll et al. |
| 5,105,351 A | 4/1992 | Harada et al. |
| 5,138,249 A | 8/1992 | Capel |
| 5,168,422 A | 12/1992 | Duncan |
| 5,195,721 A | 3/1993 | Akkerman |
| 5,210,519 A | 5/1993 | Moore |
| 5,230,033 A | 7/1993 | Soodak |
| 5,285,563 A | 2/1994 | Nove et al. |
| 5,297,015 A | 3/1994 | Miyazaki et al. |
| 5,301,096 A | 4/1994 | Klontz et al. |
| 5,311,419 A | 5/1994 | Shires |
| 5,418,707 A | 5/1995 | Shimer et al. |
| 5,433,245 A | 7/1995 | Prather et al. |
| 5,489,897 A | 2/1996 | Inoue |
| 5,508,903 A | 4/1996 | Alexandrov |
| 5,563,780 A | 10/1996 | Goad |
| 5,572,182 A | 11/1996 | De Pinho Filho et al. |
| 5,573,032 A | 11/1996 | Lenz et al. |
| 5,610,452 A | 3/1997 | Shimer et al. |
| 5,629,844 A | 5/1997 | Krichtafovitch et al. |
| 5,682,303 A | 10/1997 | Goad |
| 5,731,969 A | 3/1998 | Small |
| 5,754,028 A | 5/1998 | Vezzini |
| 5,768,117 A * | 6/1998 | Takahashi et al. ............... 363/65 |
| 5,811,889 A | 9/1998 | Massie |
| 5,825,638 A | 10/1998 | Shutts |
| 5,832,996 A | 11/1998 | Carmody et al. |
| 5,923,550 A | 7/1999 | Kumar |
| 5,930,340 A | 7/1999 | Bell |
| 5,982,645 A | 11/1999 | Levran et al. |
| 5,983,743 A | 11/1999 | McGregor et al. |
| 5,984,260 A | 11/1999 | Rawson et al. |
| 6,032,924 A | 3/2000 | Castle |
| 6,041,667 A | 3/2000 | Pischinger et al. |
| 6,073,907 A | 6/2000 | Schreiner, Jr. et al. |
| 6,094,366 A | 7/2000 | Kalfhaus |
| 6,095,487 A | 8/2000 | Waber |
| 6,152,167 A | 11/2000 | Baker |
| 6,154,381 A | 11/2000 | Kajouke et al. |
| 6,158,295 A | 12/2000 | Nielsen |
| 6,181,576 B1 | 1/2001 | Ikeda et al. |
| 6,269,015 B1 | 7/2001 | Ideda et al. |
| 6,329,726 B1 | 12/2001 | Lau et al. |
| 6,356,384 B1 | 3/2002 | Islam |
| 6,385,057 B1 | 5/2002 | Barron |
| 6,388,904 B2 | 5/2002 | Nomura |
| 6,407,987 B1 | 6/2002 | Abraham |
| 6,411,527 B1 | 6/2002 | Reinold |
| 6,420,976 B1 | 7/2002 | Baggs et al. |
| 6,446,519 B1 | 9/2002 | Biester |
| 6,494,257 B2 | 12/2002 | Bartlett et al. |
| 6,529,120 B1 | 3/2003 | Bielenko et al. |
| 6,559,385 B1 | 5/2003 | Johnson et al. |
| 6,595,487 B2 | 7/2003 | Johansen et al. |
| 6,615,916 B1 | 9/2003 | Vachon |
| 6,659,200 B1 | 12/2003 | Eppink |
| 6,668,639 B2 | 12/2003 | Fong et al. |
| 6,741,162 B1 | 5/2004 | Sacca et al. |
| 6,937,923 B1 | 8/2005 | Bassett |
| 6,965,302 B2 | 11/2005 | Mollenkopf et al. |
| 6,998,962 B2 | 2/2006 | Cope et al. |
| 7,075,414 B2 | 7/2006 | Giannini et al. |
| 7,264,057 B2 | 9/2007 | Rytlewski et al. |
| 7,433,214 B2 | 10/2008 | Kunow et al. |
| 7,615,893 B2 | 11/2009 | Biester et al. |
| 2005/0013148 A1 | 1/2005 | Kunow et al. |

FOREIGN PATENT DOCUMENTS

| | | |
|---|---|---|
| DE | 145 982 | 1/1981 |
| DE | 3224041 | 3/1983 |
| DE | 34 17 455 | 5/1984 |
| DE | 33 03 248 | 8/1984 |
| DE | 33 16 258 | 11/1984 |
| DE | 34 24 041 | 1/1986 |
| DE | 38 32 304 | 3/1990 |
| DE | 43 44 709 | 6/1993 |
| DE | 44 14 677 | 11/1995 |
| DE | 196 14 627 | 10/1997 |
| DE | 197 14 552 | 10/1998 |
| DE | 197 50 041 | 1/1999 |
| DE | 199 09 712 | 7/2000 |
| DE | 199 63 105 | 6/2001 |
| EP | 0 028 296 | 8/1980 |
| EP | 0 303 801 | 6/1986 |
| EP | 0 626 670 | 11/1994 |
| EP | 0 384 607 | 6/1995 |
| EP | 1 024 422 | 8/2000 |
| EP | 1 107 437 | 2/2001 |
| EP | 1 244 203 | 12/2001 |
| FR | 1 390 757 | 1/1965 |
| FR | 2309748 | 11/1976 |
| FR | 2 353 992 | 12/1977 |
| GB | 1 001 629 | 8/1965 |
| GB | 2332220 | 6/1989 |
| GB | 2 266 942 | 11/1993 |
| GB | 2 141 882 | 1/1995 |
| JP | 59 103570 | 6/1984 |
| JP | 61 076071 | 4/1986 |
| JP | 61 240858 | 3/1987 |
| JP | 62 217857 | 9/1987 |
| JP | 63 308420 | 12/1988 |
| JP | 01 114368 | 5/1989 |
| JP | 03 206362 | 8/1990 |
| JP | 03 065054 | 3/1991 |
| JP | 03 150068 | 10/1991 |
| JP | 04 200270 | 7/1992 |
| JP | 05 327381 | 12/1993 |
| JP | 07 154967 | 6/1995 |
| JP | 08338391 | 12/1996 |
| SU | 1270293 | 11/1986 |
| SU | 1 709 511 | 1/1992 |
| WO | WO 95/20836 | 8/1995 |
| WO | WO 96/28878 | 9/1996 |
| WO | WO 97/38479 | 10/1997 |
| WO | WO 98/30816 | 7/1998 |
| WO | WO 99 37009 | 7/1999 |
| WO | WO 01 37411 | 5/2001 |
| WO | WO 01/52397 | 7/2001 |
| WO | WO 01/84689 | 11/2001 |

OTHER PUBLICATIONS

Engels, Ludwig, u.a.: *Informationsübertragung, Proze βankopplung und und Komponenten eines Doppelrechnersystems*. In: etz-a, Bd. 98, 1977; (pp. 602-606).

Brusewitz, M.: *Elektrochemische Aktoren*; F&M Feinwerktechnik Mikrotechnik Mikroelektronik; vol. 106, No. 7/8; Jul. 1998 (pp. 527-530).

J. R. Pinheiro et al; *Isolated Interleaved-Phase-Shift-PWM de-dc ZVS Converters*; IEEE 2000; (pp. 2383-2388).

Rene Torrico-Bascope et al; *Dual-Bridge DC-DC Converter with Soft Switching Features*; IEEE 2001; (pp. 722-727).

Demercil S. Oliveira et al; *A Lossless Commutation PWM Two Level Forward Converter Operating Like a Full-Bridge*; IEEE 2000 (pp. 334-339).

Demercil S. Oliveira et al; *A Lossless Commutation PWM Two Level Forward Converter Operating Like a Full-Bridge*; IEEE 2000 (pp. 582-588).

J. E. Baggio et al; *An Improved Full-Load-Range Isolated ZVS-*

PWM DC_DC Converter; IEEE 2001 (pp. 708-714).
German Search Report for Appl. No. 200 18 562.4 dated Jul. 11, 2001 (pp. 4).
German Search Report for Appl. No. 200 18 560.8 dated Oct. 23, 2001 (pp. 4).
British Combined Search and Examination Report for Appln. No. GB0603309.6 dated Mar. 14, 2006 (pp. 6).
British Combined Search and Examination Report for Appln. No. GB0603306.2 dated Mar. 14, 2006 (pp. 5).
British Combined Search and Examination Report for Appln. No. GB0603307.0 dated Mar. 14, 2006 (pp. 6).
International Search Report for Appln. No. PCT/EP01/09513 dated Mar. 6, 2002 (pp. 7).
International Search Report for Appln. No. PCT/EP/12548 dated May 17, 2002 (pp. 2).
International Search Report and Written Opinion for Appl. No. PCT/US05/14593 dated Sep. 29, 2006; (18 p.).
International Search Report for Appln. No. PCT/EP01/12550 dated Feb. 26, 2002 (pp. 6).
International Search Report for Appln. No. PCT/EP02/10471 dated Jul. 14, 2003 (pp. 10).
International Search Report for Appl. No. PCT/EP02/10467 dated Sep. 29, 2003 (pp. 8).
Partial International Search Report for Appl. No. PCT/EP02/10468 dated Jan. 16, 2003 (pp. 11).
Partial International Search Report for Appln No. PCT/EP02/10469 dated May 16, 2003 (pp. 7).
International Search Report for Appl. No. PCT/EP02/10469 dated Oct. 23, 3003 (pp. 12).
EP Office Action Dated Dec. 5, 2008 for Appl. No. 01 980 532.4-2207 (3 pp.).
Translation of Norwegian Official Action dated Jan. 17, 2007 for Appl. No. 20031892 (3 p.).
Translation of Norwegian Official Action Dated Dec. 7, 2007 for Appl. No. 2004 1129 (pp. 6).
Translation of Norwegian Official Action dated Sep. 11, 2008 for Appl. No. 2004 1129 (p. 2).
Translation of Norwegian Official Action Dated Nov. 5, 2008 for Appl. No. 2004 1130 (pp. 6).
Translation of Norwegian Official Action Dated Jan. 30, 2008 for Appl. No. 2004 1130 (pp. 7).
Translation of Norwegian Official Action dated May 25, 2009 for Appl. No. 2004 1130 (p. 3).
Translation of Norwegian Official Action Dated Sep. 11, 2008 for Appl. No. 2004 1128 (1 p.).
Translation of Norwegian Official Action Dated Dec. 7, 2007 for Appl. No. 2004 1128 (pp. 3).
Translation of Norwegian Official Action dated Apr. 2, 2009 for Appl. No. 2004 1128; (p. 1).
Translation of Norwegian Official Action Dated Feb. 5, 2008 for Appl. No. 2004 1134 (pp. 3).
Translation of Norwegian Official Action dated Jan. 6, 2009 for Appl. No. 2004 1134; (pp. 4).
Supplemental Notice of Allowability for U.S. Appl. No. 10/489,584 dated Aug. 27, 2008 (pp. 4).
Office Action dated Nov. 17, 2005 for U.S. Appl. No. 10/415,510 (pp. 19).
Response to Office Action dated Nov. 17, 2005 for U.S. Appl. No. 10/415,510 (pp. 34).
Final Office Action dated May 16, 2006 for U.S. Appl. No. 10/415,510 (19 p.).
Response to Final Office Action dated May 16, 2006 for U.S. Appl. No. 10/415,510 (pp. 22).
Office Action dated Aug. 14, 2006 for U.S. Appl. No. 10/415,510 (22 p.).
Response to Office Action dated Aug. 14, 2006 for U.S. Appl. No. 10/415,510 (pp. 15).
Office Action dated Jan. 31, 2007 for U.S. Appl. No. 10/415,510 (pp. 21).
Response to Office Action dated Jan. 31, 2007 for U.S. Appl. No. 10/415,510 (pp. 16).
Office Action dated Oct. 9, 2007 for U.S. Appl. No. 10/415,510; (24 p.).
Response to Office Action dated Oct. 9, 2007 for U.S. Appl. No. 10/415,510 (24 p.).
Office Action dated Jun. 20, 2008 for U.S. Appl. No. 10/415,510 (24 p.).
Response to Office Action Dated Jun. 20, 2008 for U.S. Appl. No. 10/415,510 (pp. 18).
Office Action Dated Jan. 7, 2009 for U.S. Appl. No. 10/415,510 (23 p.).
Response to Final Office Action Dated Jan. 7, 2009 for U.S. Appl. No. 10/415,510 (18 pp.).
Notice of Allowance and Fee(s) Due dated May 4, 2009 for U.S. Appl. No. 10/415,510; (pp. 13).
Office Action dated Aug. 30, 2006 for U.S. Appl. No. 10/836,559 (15 p.).
Response to Office Action Dated Aug. 30, 2006 for U.S. Appl. No. 10/836,559 (pp. 24).
Office Action dated Feb. 23, 2007 for U.S. Appl. No. 10/836,559 (20 p.).
Response to Office Action Dated Feb. 23, 2007 for U.S. Appl. No. 10/836,559 (pp. 15 ).
Request for Continued Examination (RCE) and Response to Final Office Action for U.S. Appl. No. 10/836,559 Dated Aug. 9, 2007 (pp. 13).
Office Action Dated Feb. 21, 2008 for U.S. Appl. No. 10/836,559 (pp. 17).
Response to Office Action Dated Feb. 21, 2008 for U.S. Appl. No. 10/836,559 (pp. 12).
Office Action Dated Aug. 15, 2008 for U.S. Appl. No. 10/836,559 (pp. 17).
Response to Office Action Dated Aug. 15, 2008 for U.S. Appl. No. 10/836,559 (pp. 21).
Final Office Action Dated Feb. 19, 2009 for U.S. Appl. No. 10/836,559 (18 pp.).
Response to Final Office Action dated Feb. 19, 2009 for U.S. Appl. No. 10/836,559 ; (pp. 12).
Notice of Allowance and Fee(s) Due dated Jun. 26, 2009 for U.S. Appl. No. 10/836,559 (pp. 14).
Office Action dated May 30, 2007 for U.S. Appl. No. 10/489,573 ( 37 p).
Response to Office Action dated May 30, 2007 for U.S. Appl. No. 10/489,573 (pp. 9).
Final Office Action Dated Nov. 13, 2007 for U.S. Appl. No. 10/489,573; (26 p.).
Office Action dated Dec. 8, 2005 for U.S. Appl. No. 10/489,533 (20 p.).
Response to Office Action Dated Dec. 8, 2005 for U.S. Appl. No. 10/489,533 (23 p.).
Final Office Action dated Jul. 28, 2006 Jul. 28, 2006 for U.S. Appl. No. 10/489,533 (19 p.).
Response to Final Office Action Dated Jul. 28, 2006 for U.S. Appl. No. 10/489,533 (pp. 14).
Office Action dated Dec. 19, 2006 for U.S. Appl. No. 10/489,533 (16 p.).
Response to Office Action Dated Dec. 19, 2006 for U.S. Appl. No. 10/489,533 (pp. 12).
Final Office Action dated May 18, 2007 for U.S. Appl. No. 10/489,533 (15 p.).
Request for Continued Examination, Amendment, and Response to Final Office Action for U.S. Appl. No. 10/489,533 Dated May 18, 2007 for U.S. Appl. No. 10/489,533 (pp. 13).
Office Action Dated Oct. 18, 2007 for U.S. Appl. No. 10/489,533; (15 p.).
Response to Office Action Dated Oct. 18, 2007 for U.S. Appl. No. 10/489,533 (pp. 11).
Office Action Dated Apr. 7, 2008 for U.S. Appl. No. 10/489,533 (pp. 18).
Response to Office Action Dated Apr. 7, 2008 for U.S. Appl. No. 10/489,533 (pp. 10).
Final Office Action Dated Dec. 12, 2008 for U.S. Appl. No. 10/489,533 (pp. 18).
Response to Final Office Action Dated Dec. 12, 2008 for U.S. Appl. No. 10/489,533 (11 pp.).

Office Action dated Sep. 2, 2009 for U.S. Appl. No. 10/489,533 (16 p.).
Response to Office Action dated Sep. 2, 2009 for U.S. Appl. No. 10/489,533 (13 p.).
Office Action dated Jul. 3, 2006 for U.S. Appl. No. 10/489,583 (17 p.).
Response to Office Action Dated Jul. 3, 2006 for U.S. Appl. No. 10/489,583 (pp. 9).
Office Action dated Dec. 15, 2006 for U.S. Appl. No. 10/489,583 (21 p.).
Response to Office Action Dated Dec. 15, 2006 for U.S. Appl. No. 10/489,583 (pp. 10).
Office Action Dated Jun. 4, 2007 for U.S. Appl. No. 10/489,583 (16 p.).
Response to Office Action Dated Jun. 4, 2007 for U.S. Appl. No. 10/489,583 (pp. 10).
Final Office Action Dated Nov. 13, 2007 for U.S. Appl. No. 10/489,583 (16 p.).
Notice of Allowance and Fee(s) Due Dated Jul. 16, 2008 for U.S. Appl. No. 10/489,583 (pp. 7).
Supplemental Notice of Allowability for U.S. Appl. No. 10/489,583 Dated Aug. 4, 2008 (pp. 5).
Office Action Dated Jul. 17, 2006 for U.S. Appl. No. 10/489,584 (17 p.).
Response to Office Action Dated Jul. 17, 2006 for U.S. Appl. No. 10/489,584 (pp. 17).
Final Office Action Dated Jun. 15, 2007 for U.S. Appl. No. 10/489,584 (12 p.).
Notice of Allowance and Fee(s) Due for U.S. Appl. No. 10/489,584 Dated May 29, 2008 (pp. 13).
Office Action dated Apr. 16, 2009 for U.S. Appl. No. 12/255,898 (17 p.).
Response to Office Action dated Apr. 16, 2009 for U.S. Appl. No. 12/255,898 (9 p.).
Notice of Allowance and Fee(s) Due Dated Nov. 4, 2009 for U.S. Appl. No. 12/255,898 (8 p.).
Office Action dated Jun. 26, 2009 for U.S. Appl. No. 12/244,215 (15 p.).
Response to Office Action dated Jun. 26, 2009 for U.S. Appl. No. 12/244,215 (10 p.).
Final Office Action dated Dec. 30, 2009 for U.S. Appl. No. 12/244,215; (16 p.).
Response to Final Office Action dated Dec. 30, 2009 for U.S. Appl. No. 12/244,215; (9 p.).
Request for Continued Examination and Response to Final Office Action dated Dec. 30, 2009 for U.S. Appl. No. 12/244,215; (9 p.).
Office Action dated May 13, 2010 for U.S. Appl. No. 12/244,215; (11 p.).
Translation of Norwegian Official Action Dated Jan. 30, 2008 for appl. No. 2004 1130; (p. 7).
Office Action dated May 30, 2007 for U.S. Appl. No. 10/489,573; (36 p.).
Response to Office Action dated May 30, 2007 for U.S. Appl. No. 10/489,573; (9 p.).
Final Office Action dated Nov. 13, 2007 for U.S. Appl. No. 10/489,573; (26 p.).
Office Action dated Oct. 4, 2010 for U.S. Appl. No. 12/541,227.
Jan. 4, 2011 Response to Office Action dated Oct. 4, 2010 for U.S. Appl. No. 12/541,227.
Office Action dated Nov. 3, 2010 for U.S. Appl. No. 12/567,105.
Mar. 3, 2011 Response to Office Action dated Nov. 3, 2010 for U.S. Appl. No. 12/567,105.
Notice of Allowance dated Sep. 29, 2010 for U.S. Appl. No. 12/244,215.
Response to Final Office Action dated May 11, 2011; U.S. Appl. No. 12/567,105; Response filed Aug. 10, 2011 (12 p.).
Notice of Allowance dated Sep. 30, 2011; U.S. Appl. No. 10/489,573 (11 p.).

* cited by examiner

DC VOLTAGE CONVERTING DEVICE

CROSS-REFERENCE TO RELATED APPLICATION

This application is a divisional of U.S. application Ser. No. 10/489,533, filed Aug. 5, 2004, which claims priority to PCT/EP02/10467 filed 18 Sep. 2002 and to German Application No. DE 201 15 475.7 filed 19 Sep. 2001, all hereby incorporated herein by reference.

BACKGROUND OF THE INVENTION

A DC voltage converting device is connected to a DC voltage source on the input side. On the output side, the converting device supplies a converted DC voltage to at least one electrical consumer.

Such DC voltage converting devices are in particular used in fields where DC voltages must be converted and/or stabilized. Typical applications are e.g. photovoltaic installations, the automotive industry, direct-current traction drives for subways and streetcars, household drives for hair dryer, drilling machine, or the like, telecommunications and also semiconductor technology.

If a high DC voltage is present on the input side, a corresponding conversion into another DC voltage is difficult as a rule because corresponding components of the converting device do not show a sufficiently high breakdown strength. Moreover, in the case of a high power to be transmitted, the heat developed in the converting device may be considerable even if the power loss is only 10 or 20%. To be able to discharge the power loss converted into heat, corresponding cooling means must be provided. This makes the converting device more expensive and also larger due to the additional cooling means.

BRIEF SUMMARY OF THE PREFERRED EMBODIMENTS

It is therefore the object of the present invention to improve a DC voltage converting device of the above-mentioned type such that also with high DC voltages on the input side a conversion into another DC voltage is possible without any special constructional efforts and high costs while complicated cooling means, or the like, are avoided at the same time.

In connection with the features of the preamble of patent claim 1, this object is achieved in that the DC voltage converting device comprises a plurality of DC voltage converting units of which each is serially connected to the DC voltage source on the input side and connected in parallel with the cable connection on the output side for supplying the corresponding DC voltage for the electrical consumer.

Due to the use of the converting units and the special wiring with respect to the DC voltage source, each unit converts only part of the high DC voltage applied. For instance, if there is a DC voltage of 6000 V on the input side, each of the converting units will only convert the nth fraction of the input voltage if these are of an identical construction and on condition that there is a number of n converting units. For instance, if n is 30, each converting unit would only convert 200 V. The breakdown strength of the corresponding components of the converting units is normally considerably higher than 200 V, so that there is no risk in this respect.

On the output side, depending on the design of the converting units and with a corresponding wiring to the cable connection, it is e.g. possible to provide a value of 300 V for the electrical consumer.

Of course, it is possible to use different numbers of converting units, the number following e.g. from the high DC voltage applied on the input side, from the output voltage needed by the electrical consumer, or the like. It is also possible that the converting units are of no similar construction, but convert e.g. different amounts of the input voltage per converting unit into a corresponding output voltage. However, for reasons of maintenance and repair, it is of greater advantage to give all converting units an identical design.

Moreover, it is ensured through the number of the converting units that, when one, two, three or even more converting units fail, a complete failure of the voltage supply to the electrical consumer need not be feared (redundancy). Instead of this, the converting units that are still operative can receive more voltage on the input side and convert the same into the output voltage required.

A further advantage of the use of a plurality of converting units is that even with increased powers in the kW range of e.g. 6000 volt and 1, 2, 3 or more amp, the power loss of the converting device is distributed over the corresponding converting units. Heat corresponding to the power loss is thus not generated pointwise and within a confined space, but the heat is generated such that it is substantially evenly distributed over all converting units. This simplifies the cooling process considerably and, as a rule, just requires a simple air cooling or no further cooling than by the environment, depending on the respective arrangement of the converting units.

For instance, the converting units may be spaced apart from one another such that they do not mutually affect one another in their heat development, and each converting unit can thus be cooled separately.

Depending on the number and design of the converting units, DC voltages of about 1 kV to 10 kV and, in particular, 3 kV to 8 kV may be present on the input side. It should once again be pointed out that even higher input voltages with a correspondingly high power can be converted if the number of the converting units or their corresponding construction is matched accordingly. Attention must here above all be paid that the breakdown strength of the components of every converting unit is at least so high that the amount of the input voltage to be converted by the converting unit is smaller than the breakdown strength.

To be able to receive the DC voltages without any great loss or interference also over large distances from the DC voltage source, the DC voltage converting device may be connected via a coaxial cable connection to the DC voltage source. Even at high DC voltages and high powers, such a coaxial cable connection may have a small cross-section, whereby the costs are considerably reduced, for instance, in comparison with an AC voltage supply. Moreover, a coaxial cable connection is well suited also for data transmission in addition to transmitting electrical power. As for a DC voltage transmission, attention must further be paid that there are only conductor losses and no attenuation losses in addition, as is the case with the transmission of AC voltage.

To be able to transmit data sent via the cable connection in the direction of the DC voltage source, i.e. without interference and at a high speed, the DC voltage converting device may comprise a filter means arranged upstream on the input side.

To use highly efficient converting units that, consequently, only generate a small amount of heat and thus ensure a high reliability and, economically speaking, are excellent in production and operation at the same time, a corresponding DC voltage converting unit may be designed as a clocked switch mode power supply. In comparison with e.g. linear controlled power supplies, these offer the further advantage that they show a small volume, a reduced noise development, reduced smoothing demands and an increased input voltage range.

The switch mode power supplies are subdivided into primarily and secondarily clocked or switched ones. To ensure an electrical isolation between input and output of the converting device, the switch mode power supply may preferably be clocked (switched) primarily.

If, in particular, high output powers are to be generated in the kW range, the switch mode power supply may be designed as a push-pull converter. Such a converter is further characterized by a lower current load of its semiconductor components, an easy adjustability of the output voltage, high efficiency and a small transformer as the transforming means.

Such a push-pull converter may be designed as a half-bridge or full-bridge push-pull converter. In particular for maximum powers the switch mode power supply may be designed as a full-bridge push-pull converter.

A switching means for correspondingly switching the transformer of the switch mode power supply may e.g. be designed as a switching transistor, in particular a power MOSFET or BIMOSFET. It is also possible that the switching means is designed as a thyristor.

In a push-pull converter, at least two switching transistors are used that operate in the push-pull mode. Advantageously, it is also possible to operate in the push-pull mode with a clock ratio of 1:1. This means that both switching transistors are each switched through alternately for the same periods of time.

To obtain an output voltage that is as smooth as possible and has a relatively small amount of harmonics, the switch mode power supplies of the DC converting device may be clocked in synchronism. This means that all switch mode power supplies are clocked at the same clock rate.

To increase a cutoff frequency of the system as much as possible with respect to interferences of the DC voltage on the secondary side, the switch mode power supplies of the DC converting device may be clocked with respect to one another in phase-shifted fashion.

To produce corresponding harmonics only to a small degree in this connection, a phase shift in the clocking of neighboring switch mode power supplies may be 1/n each if n is the number of the switch mode power supplies of the DC voltage converting device. Hence, the phase shift is such that the n+1 th switch mode power supply would be again in phase with the first switch mode power supply (cyclic phase shift).

To transmit also data in particular via the coaxial cable connection to the DC voltage source, a data signal coupling/decoupling means may be arranged upstream of the filter means in the direction of the DC voltage source. Said means serves the communication with the DC voltage source that is possibly far away and with all of the further means located there. This communication connection also serves to monitor, control and, optionally, regulate the components of the DC voltage converting device and the electrical consumers connected therewith via the cable connection.

To monitor, control and regulate the corresponding components of the DC voltage converting device on site, a controller may be assigned at least to the DC voltage converting device and the components thereof. However, the controller may also be responsible for electrical consumers supplied by the converting device with DC voltage and may monitor the same in their function and carry out the control or regulation of the consumers.

To ensure an undisturbed transmission of a communication connection in this respect and to scan the DC voltage on the input side substantially completely at the same time, the clock rate of the switch mode power supply may be in the range of 10 kHz to more than 1 MHz and, in particular, in the range of 50 kHz to 300 kHz.

In this connection each switch mode power supply can e.g. be readjusted in its output voltage via changes in the duty factor, in particular, in case of failure of another switch mode power supply of the DC voltage converting device.

In the simplest case a readjustment of the output voltage of a switch mode power supply can take place via a change in the duty factor of the switching transistor.

To control the switching transistors accordingly, the switch mode power supply may comprise a pulse modulation means for the clocked control of the switching transistors, the pulse modulation means supplying a sequence of pulses of a variable width and/or height and/or frequency for clocking the switching transistors.

In connection with the filter means, it should additionally be mentioned that said means filters, in particular, the frequency range within which the communication connection to the DC voltage source takes place. This means that only a lower frequency range of up to e.g. 50 kHz is filtered. Relatively simple and inexpensive filters are thus sufficient.

The controller used according to the invention can be designed in its monitoring function such that it monitors e.g. the individual switch mode power supplies, reports on the failure of corresponding switch mode power supplies and the location of said switch mode power supplies within the DC voltage converting device and sends an alarm message in case of failure of a predetermined number of switch mode power supplies. The corresponding information of the controller can be transmitted via the coaxial cable connection to the DC voltage source that is located far away, and can be represented there accordingly.

BRIEF DESCRIPTION OF THE DRAWINGS

An advantageous embodiment of the invention shall now be explained in more detail in the following with reference to the figures attached to the drawing, in which.

DETAILED DESCRIPTION OF THE PREFERRED EMBODIMENTS

Figure 1:
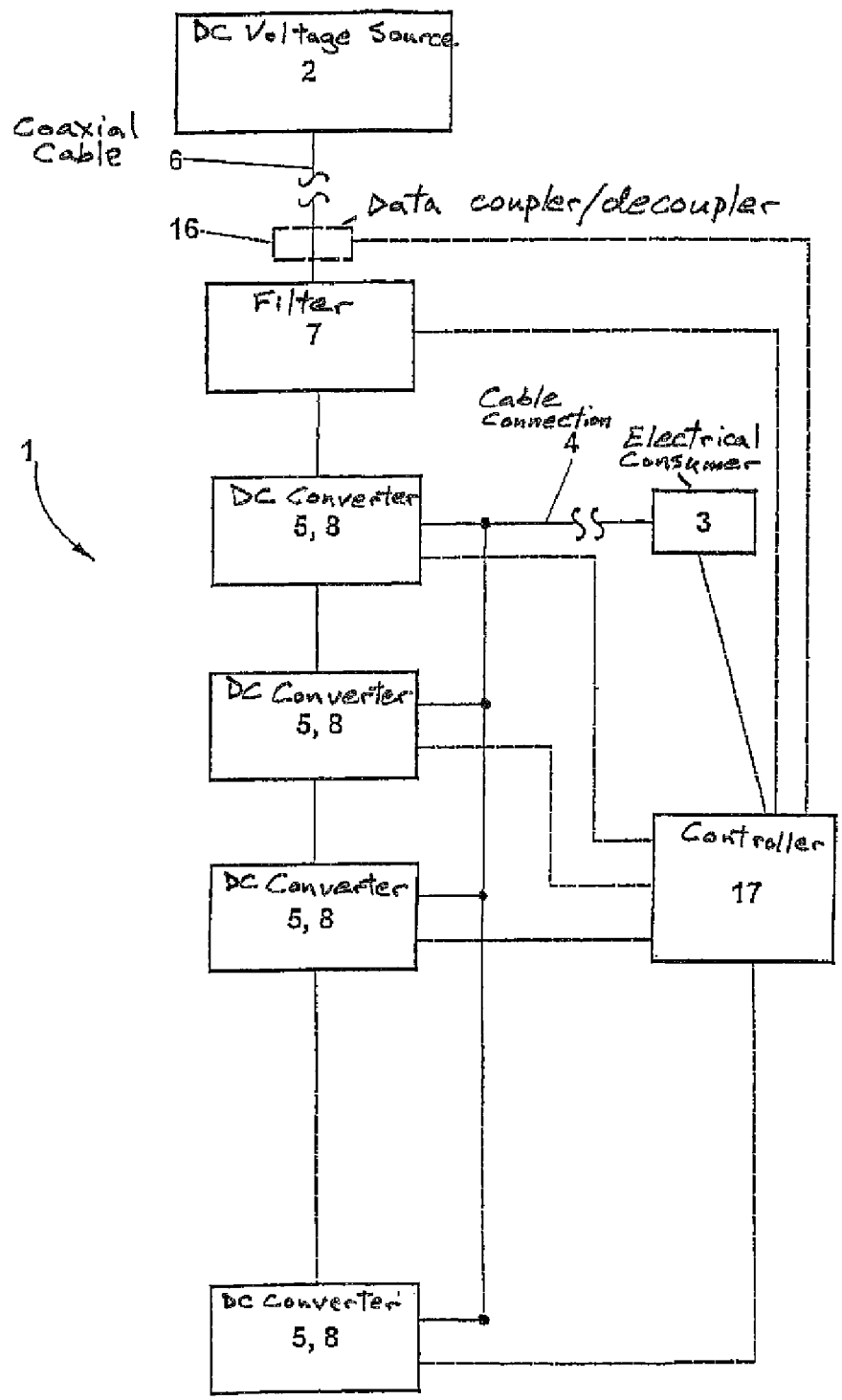
FIG. 1 is a block diagram of an embodiment of the DC voltage converting device according to the invention.

FIG. 1 is a schematic illustration showing an embodiment of the DC voltage converting device 1 according to the invention.

The converting device 1 comprises a plurality of DC converting units 5 in the form of switch mode power supplies 8. These are wired one after the other on the input side and connected to a DC voltage source 2 via a coaxial cable connection 6. The DC voltage source 2 may be arranged at a remote place; the length of the coaxial cable connection 6 may here be several kilometers, for instance 50, 60 or more kilometers.

A filter means 7 is arranged upstream of the DC voltage converting units 5. This means filters, in particular, a frequency range needed for a communication connection to the DC voltage source 2. The filtering operation may e.g. be carried out within a frequency range of up to 50 kHz.

The DC voltage converting units 5 and the corresponding switch mode power supplies 8, respectively, are wired in parallel with one another on their output side and connected accordingly with a cable connection 4. The cable connection 4 leads to at least one electrical consumer 3.

Such an electrical consumer may e.g. be an actuator for a means for controlling a fluid flow into a fluid line or within the fluid line. Such means are e.g. valves, shut-off devices for emergency cases, such as leakage, pipe breakage, or the like, throttles, pumps, etc. These means and the actuators assigned to them are possibly disposed in rough terrain that is difficult to reach. The means and actuators may also be arranged underwater. The fluid can enter into the ducts at a high pressure and be guided therealong. Moreover, the fluid may be aggressive or pollute the environment, so that a corresponding monitoring and control of the fluid flow is of utmost importance.

The means and the actuators assigned to them, as well as the DC converting device, may be arranged below sea level. The coaxial cable connection can be laid up to the water surface to the corresponding DC voltage source. It is also possible that means and actuators are arranged on the surface of the earth at a place that is difficult to reach, and are controlled and monitored accordingly from a remote place.

A controller 17 is assigned at least to the DC voltage converting device 1 for monitoring, controlling and regulating the corresponding means. This controller can also monitor, control or regulate the electrical consumer(s) 3.

For the transmission of corresponding data to the remote DC voltage source 2 and means further assigned to said source, a data coupling/decoupling means 16 may be provided. This means is arranged upstream from the filter means 7 between filter means 7 and DC voltage source 2. Corresponding data signals can be coupled and decoupled, for instance, by the controller 17 into and out of the coaxial cable connection 6 via the data coupling/decoupling means. A communication connection is thereby established between DC voltage source 2 and the means assigned thereto and also the DC voltage converting device 1 and the electrical consumers 3 supplied by the device. The communication connection is bidirectional, so that data can be exchanged in both directions via the coaxial cable connection 6 and with the controller 7.

Figure 2:
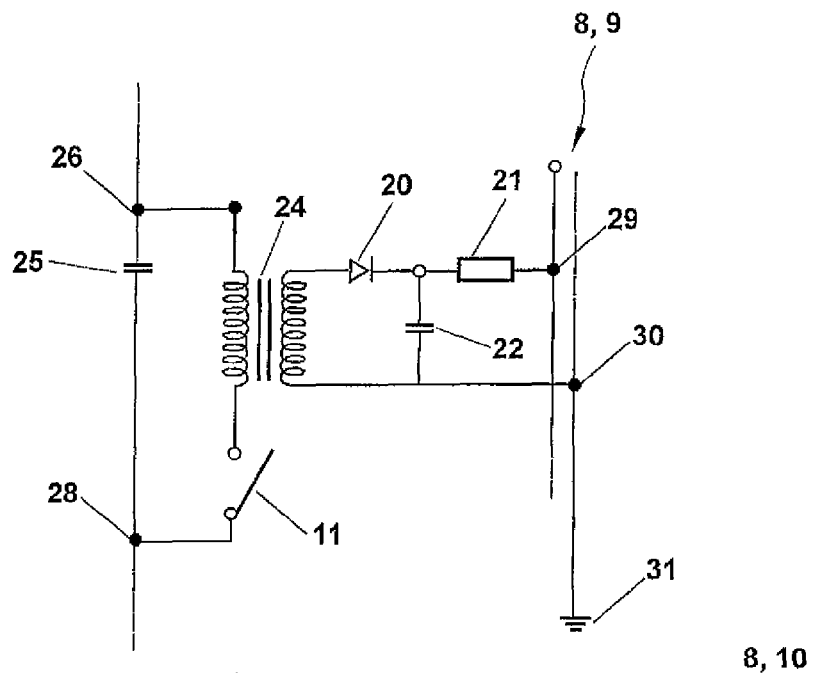
FIG. 2 shows a basic embodiment of a switch mode power supply for use in the DC voltage converting device according to FIG. 1.

FIG. 2 is a simplified illustration showing an embodiment of a switch mode power supply 8 for use for the DC voltage converting units 5 according to FIG. 1.

The switch mode power supply 8 is formed by a push-pull converter 9. Said converter is serially connected with further push-pull converters on its input side to corresponding input terminals 26 and 28. The push-pull converter 9 comprises an input capacitor 25 and a transformer 24 which are wired accordingly with the input terminals 26 and 28. The transformer 24 comprises a primary winding and a secondary winding that are coupled magnetically. The primary winding is connected in parallel with the input capacitor 25.

The primary winding is controlled and clocked accordingly via a switching means 11 of the push-pull converter 9. Said switching means 11 is formed by one or several switching transistors, see FIGS. 3 and 4. Preferably, such a switching transistor is designed as a power MOSFET, BIMOSFET or thyristor. For the purpose of simplification FIG. 2 shows the switching means 11 symbolically by way of a switch corresponding to four switching transistors and two switching transistors, respectively, in the embodiments shown in FIGS. 3 and 4.

The secondary winding is wired via a diode 20 and a load 21 to an output terminal 29. The load 21 may e.g. be an inductor 23, see FIGS. 3 and 4. A smoothing capacitor 22 is connected in parallel with the secondary winding.

The output terminal 29 and the corresponding output terminals 29 of the further switch mode power supplies 8 and the push-pull converters 9, respectively, are wired in series with one another and connected to the cable connection 4; see FIG. 1.

The further output terminal 30 on the secondary side of the push-pull converter 9 is wired with the output terminals 30 of the other push-pull converters in series with ground 31.

Figure 3:
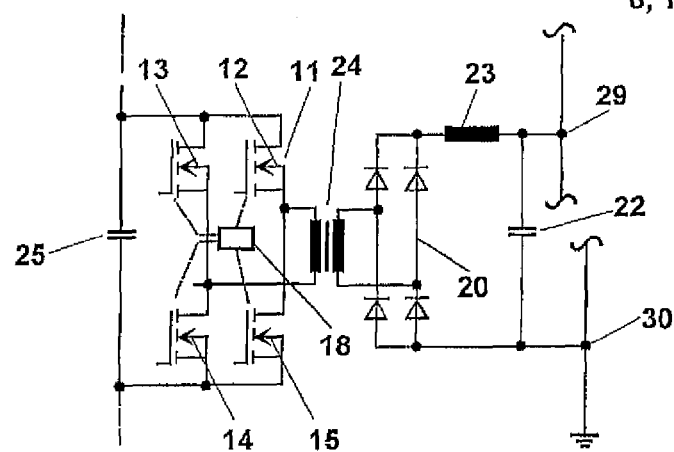
FIG. 3 shows a full-bridge push-pull converter as the switch mode power supply according to FIG. 2.
Figure 4:
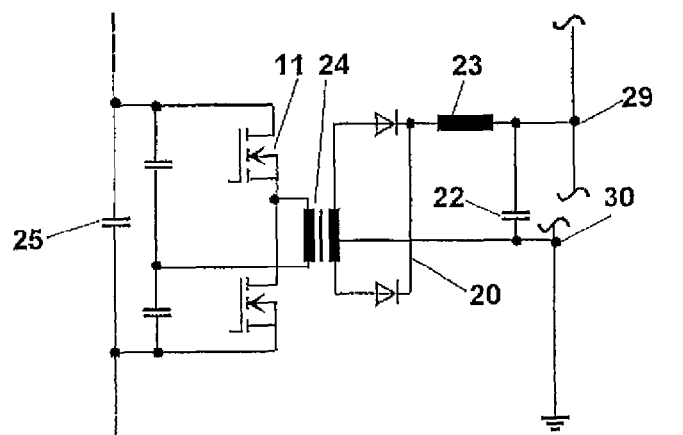
FIG. 4 shows a half-bridge push-pull converter as the switch mode power supply according to FIG. 2.

FIGS. 3 and 4 show two detailed embodiments of a push-pull converter 9.

The push-pull converter according to FIG. 3 is designed as a full-bridge push-pull converter 10.

In this converter, the switching means 11 is formed by four switching transistors 12, 13, 14 and 15. Two of the switching transistors are respectively combined and serve in pairs to supply the input voltage from the DC voltage source 2 to the primary winding, the pairs of switching transistors being controlled in the push-pull mode. The push-pull mode takes place such that the duty factor of the two pairs is 1:1 each time.

A pulse modulation means 18 is provided for the clocked control of the switching transistors. This means supplies a sequence of pulses that are variable in their width and/or height and/or frequency.

The pulse modulation means 18 is realized by a corresponding electronic circuit that is known per se.

It is possible that the duty factor is changed on the primary side, thus changing the corresponding output voltage. This takes place e.g. whenever one or several of the push-pull converters 9 have failed. Despite failure of a number of push-pull converters the desired voltage can still be supplied on the output side by the remaining push-pull converters through a corresponding control of the duty factor and an increase in the output voltage of the remaining push-pull converters. To regulate the output voltage, said voltage can be tapped continuously at the output, possibly amplified and supplied to the pulse modulation means via an optocoupler for electrical isolation.

In the further embodiment of the push-pull converter according to FIG. 4, said converter is designed as a half-bridge push-pull converter 19. In this case, essentially two switches are formed by a switching transistor. These switch the primary winding to the input voltage alternatingly in push-pull mode and non-overlapping fashion. The corresponding diodes on the output side are also conductive in alternating fashion.

The transformer 24 operates without direct current because of the symmetrical operation. This, however, is only the case if the ON periods of the switching transistors are exactly the same. This can be accomplished through a corresponding control by the pulse modulation means 18, which is not shown in FIGS. 2 and 4 for the sake of simplification.

The invention claimed is:

1. A subsea DC voltage converting device which supplies a converted DC voltage to at least one subsea electrical consumer via a cable connection,
  the subsea DC voltage converting device comprising:
    N DC voltage converting units of which each is serially connected to a DC voltage source on an input side and connected in parallel with the cable connection on an output side for supplying the converted DC voltage to the at least one subsea electrical consumer, wherein a value for N is based on a predetermined amount of power required for the at least one subsea electrical consumer, a predetermined passive cooling arrangement for the DC voltage converting units in a subsea environment, and a predetermined duty cycle control scheme for the DC voltage converting units that can compensate for failure of at least some of the DC voltage converter units, wherein the value for N is at least 20.

2. A subsea DC voltage converting device according to claim 1, wherein a DC voltage from the DC voltage source applied on the input side of the DC voltage converting units is in the order of 1 kV to 10 kV.

3. A subsea DC voltage converting device according to claim 1 wherein the cable connection comprises a coaxial cable.

4. A subsea DC voltage converting device according to claim 1 wherein the subsea DC voltage converting device further comprises a filter on the input side of the DC voltage converting units.

5. A subsea DC voltage converting device according to claim 4 wherein a data coupler/decoupler is arranged upstream of the filter in the direction of the DC voltage source.

6. A subsea DC voltage converting device according to claim 5 further comprising a controller that is assigned to one or more components selected from the group consisting of the DC voltage converting units, the filter, and the data coupler/decoupler.

7. A subsea DC voltage converting device according to claim 1 wherein each DC voltage converting unit is designed as a clocked switch mode power supply.

8. A subsea DC voltage converting device according to claim 7 wherein the switch mode power supply is primarily clocked.

9. A subsea DC voltage converting device according to claim 7 wherein the switch mode power supply is designed as a push-pull converter.

10. A subsea DC voltage converting device according to claim 7 wherein the switch mode power supply is designed as a full-bridge push-pull converter.

11. A subsea DC voltage converting device according to claim 7 wherein the switch mode power supply comprises one or more switching transistors selected from the group consisting of power MOSFET transistors and power BIMOSFET transistors.

12. A subsea DC voltage converting device according to claim 11 wherein the one or more switching transistors are clocked in push-pull fashion at a clock ratio of 1:1.

13. A subsea DC voltage converting device according to claim 11 wherein an output voltage of each switch mode power supply is readjustable in case of failure of another switch mode power supply of the subsea DC voltage converting device.

14. A subsea DC voltage converting device according to claim 13 wherein a duty factor of the one or more switching transistors is variable for readjusting the output voltage of a switch mode power supply.

15. A subsea DC voltage converting device according to claim 11 wherein the switch mode power supply comprises a pulse modulator that is operable to output a sequence of variable pulses for clocking the one or more switching transistors.

16. A subsea DC voltage converting device according to claim 7 wherein the switch mode power supplies of the subsea DC voltage converting device are clocked in synchronism.

17. A subsea DC voltage converting device according to claim 7 wherein the switch mode power supplies of the subsea DC voltage converting device are clocked in phase-shifted fashion relative to one another.

18. A subsea DC voltage converting device according to claim 17 wherein a phase shift associated with a clocking of neighboring switch mode power supplies comprises a phase shift of 1/n if n is the number of the switch mode power supplies of the subsea DC voltage converting device.

19. A subsea DC voltage converting device according to claim 7 wherein a clock frequency of the switch mode power supply is within the range of 50 kHz to 300 kHz.

20. A system for supplying power to a remote electrical device, the system comprising:

N DC voltage converters each having an input serially connected to a DC source and each having an output connected in parallel to the remote electrical device via a conductor, wherein a value for N is based on a predetermined amount of power required for the remote electrical device, a predetermined spacing requirement for the DC voltage converters due to an environment of the remote electrical device, and a predetermined redundancy control scheme for the DC voltage converters, wherein the value for N is at least 20.

21. A system for supply power to a subsea electrical device, comprising:

N subsea DC voltage converters each having an input serially connected to a DC source and each having an output connected in parallel to the subsea electrical device via a conductor, wherein at least some of the DC voltage converters are configured to convert differing amounts of input voltage into an output voltage, wherein a value for N is based on a predetermined amount of power required for the subsea electrical device and a predetermined duty cycle control scheme that can compensate for failure of at least some of the DC voltage converters, wherein the value for N is at least 20.

22. The system of claim 21 wherein at least some of the DC voltage converters have different constructions for converting differing amounts of input voltage into an output voltage.

* * * * *